US012636903B2

(12) United States Patent
Gueta

(10) Patent No.: US 12,636,903 B2
(45) Date of Patent: May 26, 2026

(54) TORAH SCROLL CASE

(71) Applicant: Rafael Gueta, Zefat (IL)

(72) Inventor: Rafael Gueta, Zefat (IL)

( * ) Notice: Subject to any disclaimer, the term of this patent is extended or adjusted under 35 U.S.C. 154(b) by 86 days.

(21) Appl. No.: 18/773,698

(22) Filed: Jul. 16, 2024

(65) Prior Publication Data

US 2025/0033400 A1 Jan. 30, 2025

(51) Int. Cl.
*B42D 19/00* (2006.01)

(52) U.S. Cl.
CPC .................................. *B42D 19/005* (2013.01)

(58) Field of Classification Search
CPC ....... B42D 19/005; A47B 97/02; G09F 11/18; G09F 11/21; H09F 11/29
USPC ..... 220/4.23, 4.22, 4.21, 23.86, 23.83, 23.2, 220/254.6, 254.3, 254.1; 242/538.2, 242/538.3
See application file for complete search history.

(56) References Cited

U.S. PATENT DOCUMENTS

| | | | | |
|---|---|---|---|---|
| D733,987 S * | 7/2015 | Coffin | .............................. | D34/9 |
| 2005/0224496 A1 * | 10/2005 | Moyer | .................... | B65F 1/068 220/264 |
| 2017/0057769 A1 * | 3/2017 | Merdinger | ......... | B42D 15/0093 |

FOREIGN PATENT DOCUMENTS

IL 212854 A * 5/2014

* cited by examiner

*Primary Examiner* — Cassandra Davis
(74) *Attorney, Agent, or Firm* — Dekel Patent Ltd; David Klein

(57) ABSTRACT

A Torah scroll case includes a middle section which is hinged at opposite sides thereof to first and second outer sections by hinges. Each of the sections forms part of a full shape, so that when the sections are closed, the sections form a closed full shape, The sections, when closed, form upper and lower discs, the upper disc including upper disc portions formed on the middle section and the first and second outer sections, and the lower disc including lower disc portions formed on the middle section and the first and second outer sections. The first and second outer sections each include a pole for placing thereon a Torah scroll, and each of the poles extends between the upper and lower discs. A hinge assembly couples the first and second outer sections to each other and to the middle section.

8 Claims, 2 Drawing Sheets

TORAH SCROLL CASE

FIELD OF THE INVENTION

The present invention relates generally to cases for Holy Scripture scrolls, and particularly to a Torah scroll case with enhanced width of the visible portion of the scroll.

BACKGROUND OF THE INVENTION

Sephardic Torah scrolls are traditionally housed in cylindrical cases. The scroll is wound around two poles which are disposed inside the case. When the Torah is read, the case is opened longitudinally such that a section of the scroll between the two poles is exposed. The poles are wound by hand during the reading to enable reading successive columns of text.

Several features have been described for improving such Torah scroll cases. For example, Israel Patent 185,298, to Rav Avraham Wozner, describes a releasable locking mechanism that can lock and release each of the Torah scroll poles at distinct locking points during rotation of the pole. Israel Patent 212,854, to Rav Avraham Wozner, describes a scroll-tautness-maintaining mechanism inside the Torah scroll case that can maintain the tautness of the scroll while the scroll is being rolled.

U.S. Pat. No. 10,399,807 (same as Israel Patent 247,210), assigned to Hazorfim Ltd., describes a control mechanism for a scrolling of a Torah parchment in a Torah scroll case, which includes an internal handle located inside the Torah scroll case, mounted on a pole on which the parchment is rolled, and an external cogwheel located outside of the Torah scroll case. Rotation of the external cogwheel results in rotation of the pole. A spring unit presses against the external cogwheel to control the movement of the pole on which the parchment is rolled.

However, there is a problem associated with such Torah scroll cases. When the case is opened and the scroll is revealed for reading, or raised and shown to the congregation, the width of the visible portion of the scroll is no more than one or two columns of text. The narrow visible portion makes it difficult for people standing to the sides of the Torah scroll to see what is being read or to see the text when the case is raised and shown to the congregation.

SUMMARY

The present invention seeks to provide a Torah scroll case with enhanced width of the visible portion of the scroll, as described in detail below.

The Torah scroll case is provided with a middle section, hinged to outer sections, and the middle section provides a significantly wider viewing area for viewing the scroll. A smooth hinge assembly is provided between the middle section and the outer sections, which prevents the outer sections from uncontrollably moving outwards, thus preventing damage to the scroll. Without the hinge assembly, the outer sections can uncontrollably move outwards when the Torah scroll case is raised and/or carried, which can cause damage to the scroll.

There is provided in accordance with a non-limiting embodiment of the invention a Torah scroll case including a middle section which is hinged at opposite sides thereof to first and second outer sections by hinges, wherein each of the sections forms part of a full shape, so that when the sections are closed, the sections form a closed full shape, wherein the sections, when closed, form upper and lower discs, the upper disc including upper disc portions formed on the middle section and the first and second outer sections, and the lower disc including lower disc portions formed on the middle section and the first and second outer sections, and wherein the first and second outer sections each include a pole for placing thereon a Torah scroll, each of the poles extending between the upper and lower discs, and a hinge assembly the couples the first and second outer sections to each other and to the middle section.

In accordance with a non-limiting embodiment of the invention the hinge assembly includes at least two meshing gears rotatingly mounted on the lower disc portion formed on the middle section, and a link member pivotally coupled to one of the gears and to the lower disc portion of the first outer section and another link member pivotally coupled to another of the gears and to the lower disc portion of the second outer section.

In accordance with a non-limiting embodiment of the invention the at least two meshing gears are mounted in recesses formed in the lower disc portion of the middle section.

BRIEF DESCRIPTION OF DRAWINGS

The present invention will be understood and appreciated more fully from the following detailed description, taken in conjunction with the drawings in which.

DETAILED DESCRIPTION

Reference is now made to FIGS. 1-4, which illustrate a Torah scroll case 10, in accordance with a non-limiting embodiment of the invention.

Torah scroll case 10 may include three sections: a middle section 12 which is hinged at opposite sides thereof to first and second outer sections 14 and 16 by hinges 18. Each section forms part of a full shape, typically but not necessarily a cylinder (the invention applies to any shape, even not cylindrical), so that when the sections are closed (as in FIGS. 1 and 4) the sections form a closed shape.

Figure 1:
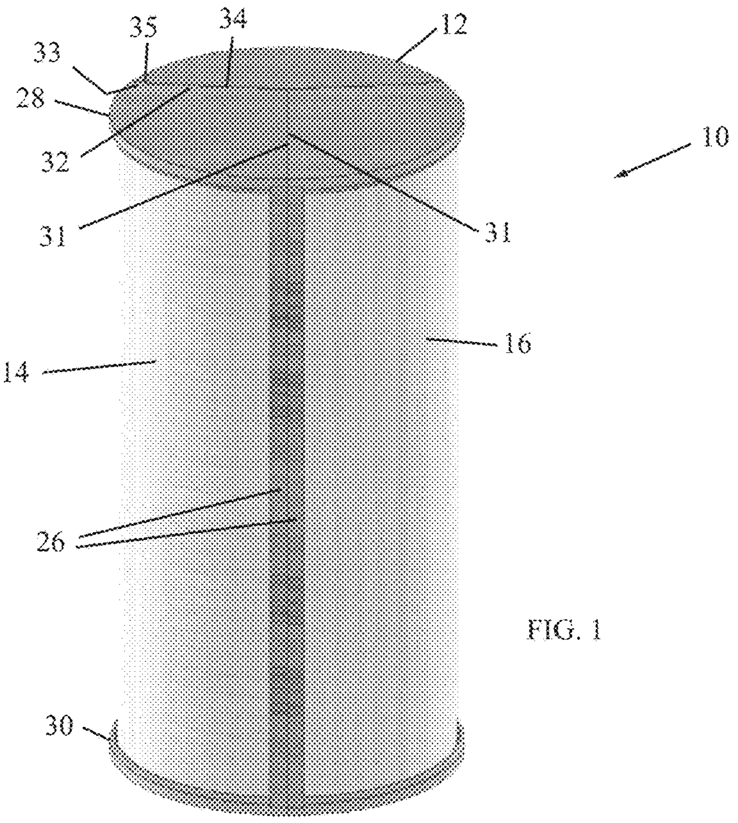
FIG. 1 is a simplified pictorial illustration of a Torah scroll case, in accordance with a non-limiting embodiment of the invention, with the case closed.
Figure 2:
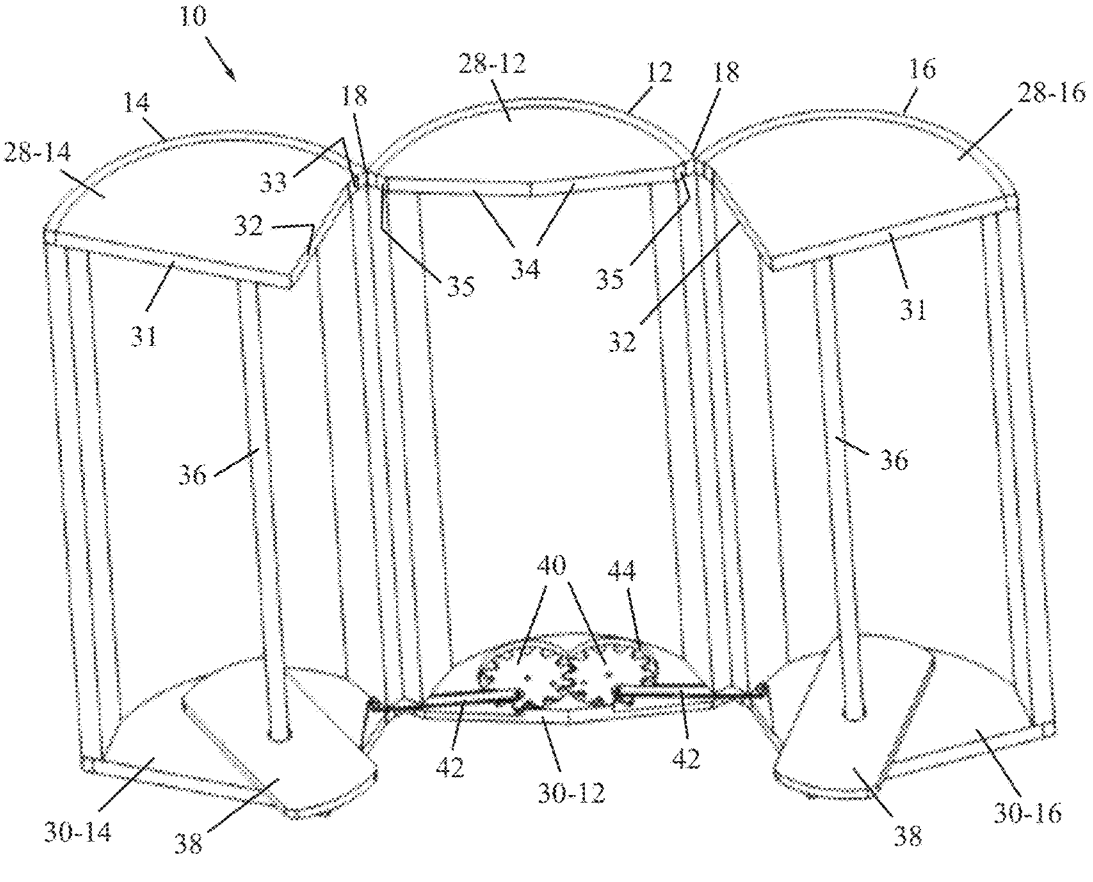
FIG. 2 is a simplified pictorial illustration of the Torah scroll case when opened.
Figure 4:
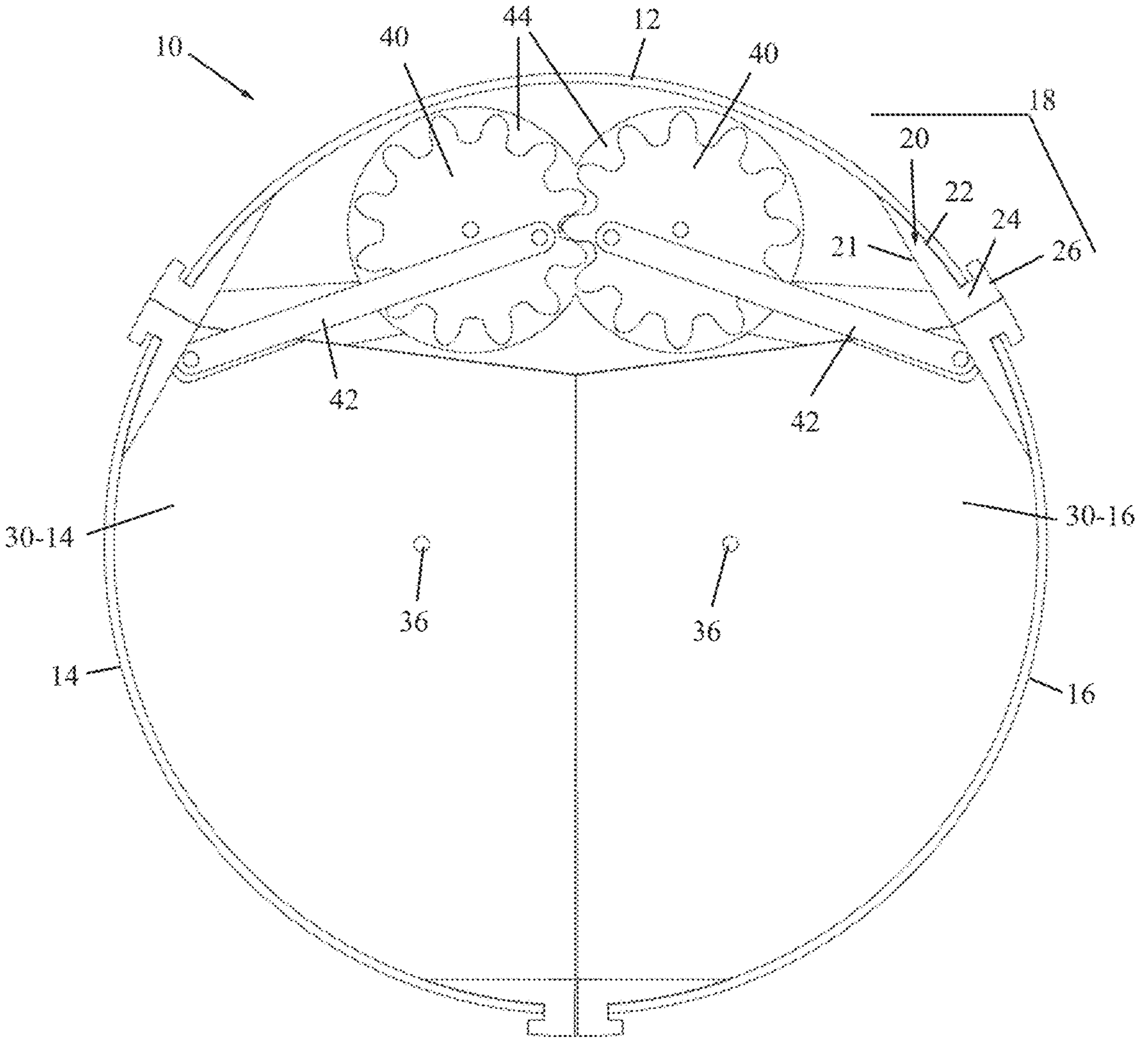
FIG. 4 is a simplified top-view illustration of the Torah scroll case when closed.

Hinge 18, as seen in FIG. 2, may be a simple piano-type strip hinge or other kinds of hinges. Alternatively, as seen in FIG. 4, hinge 18 includes two halves, each of which may include an inner wing portion 20 that extends across a small circumferential portion of the inner perimeter of the case. An inner facing surface 21 of inner wing portion 20 may be flat whereas an outer facing surface 22 of inner wing portion 20 may be curved to match the inner curvature of case 10. A spine portion 24 may radially extend from inner wing portion 20 to an outer ridge portion 26. The outer ridge portion 26 extends across a small circumferential portion of the outer perimeter of the case in the same direction as its corresponding inner wing portion. The adjoining spine portions 24 of each closed hinge 18 (FIG. 4) abut against each other, flat surface against flat surface. The adjoining outer ridge portions 26 of each closed hinge 18 (FIG. 4) also abut against each other and may form a smooth continuous ridge. The ridge formed between the first and second outer sections 14 and 16 (this is the ridge seen in FIG. 1) may include a clasp (not shown) for securing or locking the case in the closed position.

As seen in FIG. 1, the three sections, when closed, may form upper and lower discs 28 and 30 (for a cylindrical shape, the discs are generally circular; for other shapes the discs are not necessarily circular or round, but could be square or other shapes). As seen in FIG. 2, each disc may include portions on each of the three sections: upper disc portions 28-14, 28-12 and 28-16 on sections 14, 12 and 16, respectively, and lower disc portions 30-14, 30-12 and 30-16 on sections 14, 12 and 16, respectively. First and second outer sections 14 and 16 may each include abutting edges 31, from which slantingly extends a major middle-section abutting edge 32, from which slantingly extends a minor middle-section abutting edge 33. When the case is closed, the major middle-section abutting edges 32 and minor middle-section abutting edges 33 abut against major middle-section edges 34 and minor middle-section edges 35 formed on middle section 12, respectively.

As seen in FIG. 2, first and second outer sections 14 and 16 may each include a pole 36 for placing thereon a Torah scroll (not shown). Each pole 36 may extend between the upper and lower discs 28 and 30. The lower portion of pole 36 may be provided with a scroll support plate 38.

Figure 3:
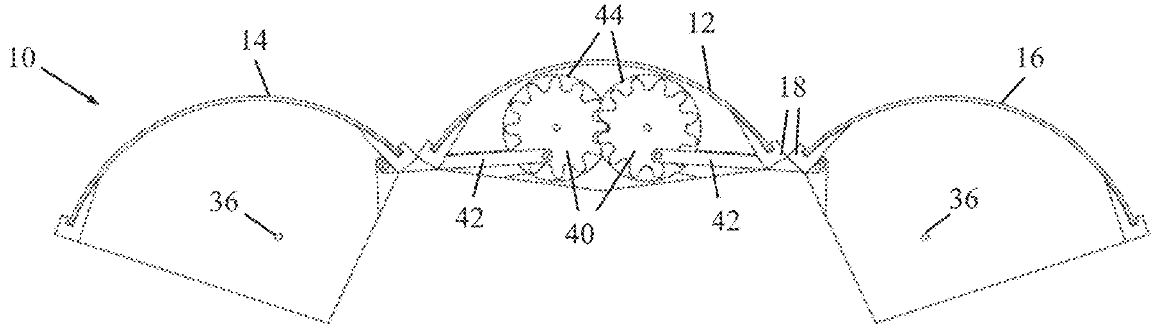
FIG. 3 is a simplified top-view illustration of the Torah scroll case when opened.

As seen in FIGS. 2-4, a gear assembly including at least two meshing gears 40 may be rotatingly mounted on lower disc portion 30-12. A link member 42 may be pivotally coupled to one gear 40 and to lower disc portion 30-14 and another link member 42 may be pivotally coupled to another gear 40 and to lower disc portion 30-16. The gears 40 may be mounted in recesses 44 formed in lower disc portion 30-12, so that the gears 40 do not touch the scroll which is mounted on poles 36.

It is noted that prior art Torah scroll cases do not have the middle section. As seen in FIGS. 2 and 3, when the case is in the open position, the middle section 12 provides a significantly wider viewing area for viewing the scroll. The gear assembly 40 and the link members 42 couple the middle section 12 to the first and second outer sections 14 and 16, and this serves as a smooth hinge assembly and prevents the outer sections from uncontrollably moving outwards, thus preventing damage to the scroll. Without the hinge assembly, the outer sections can uncontrollably move outwards when the Torah scroll case is raised and/or carried, which can cause damage to the scroll.

What is claimed is:

1. A Torah scroll case comprising:

a middle section which is hinged at opposite sides thereof to first and second outer sections by hinges, wherein each of said sections forms part of a full shape, so that when said sections are closed, said sections form a closed full shape;

wherein said sections, when closed, form upper and lower discs, said upper disc comprising upper disc portions formed on said middle section and said first and second outer sections, and said lower disc comprising lower disc portions formed on said middle section and said first and second outer sections; and wherein said first and second outer sections each comprise a pole for placing thereon a Torah scroll, each of said poles extending between said upper and lower discs; and a hinge assembly that couples said first and second outer sections to each other and to said middle section.

2. The Torah scroll case according to claim 1, wherein said hinge assembly prevents said first and second outer sections from uncontrollably moving outwards.

3. The Torah scroll case according to claim 1, wherein said hinge assembly comprises at least two meshing gears rotatingly mounted on said lower disc portion formed on said middle section, and a link member pivotally coupled to one of said gears and to said lower disc portion of said first outer section and another link member pivotally coupled to another of said gears and to said lower disc portion of said second outer section.

4. The Torah scroll case according to claim 3, wherein said at least two meshing gears are mounted in recesses formed in said lower disc portion of said middle section.

5. The Torah scroll case according to claim 1, wherein each of said hinges at the opposite sides of said middle section comprises two halves, each of the halves comprising an inner wing portion that extends across a circumferential portion of an inner perimeter of said Torah scroll case, and a spine portion that radially extends from said inner wing portion to an outer ridge portion.

6. The Torah scroll case according to claim 5, wherein said outer ridge portions, when said hinges at the opposite sides of said middle section are closed, abut against each other and form a smooth continuous ridge.

7. The Torah scroll case according to claim 1, wherein said first and second outer sections each comprise an abutting edge, from which slantingly extends a major middle-section abutting edge, from which slantingly extends a minor middle-section abutting edge, and when said Torah scroll case is closed, said major middle-section abutting edges and said minor middle-section abutting edges abut against major middle-section edges and minor middle-section edges formed on said middle section, respectively.

8. The Torah scroll case according to claim 1, wherein a lower portion of each of said poles is provided with a scroll support plate.

* * * * *